Dec. 29, 1970 C. ROSSETTI 3,551,541
METHOD OF POLYMERIZING MONOMERIC MATERIAL INTO CAST
POLYMER SHEETS AND THE APPARATUS FOR THE CASTING
OF SAID POLYMERIC SHEETS
Original Filed March 15, 1966 2 Sheets-Sheet 1

INVENTOR.
CARLO ROSSETTI
BY
ATTORNEYS.

Dec. 29, 1970     C. ROSSETTI     3,551,541
METHOD OF POLYMERIZING MONOMERIC MATERIAL INTO CAST
POLYMER SHEETS AND THE APPARATUS FOR THE CASTING
OF SAID POLYMERIC SHEETS
Original Filed March 15, 1966     2 Sheets-Sheet 2

INVENTOR.
CARLO ROSSETTI
BY
McGlew & Toren
ATTORNEYS.

United States Patent Office 3,551,541
Patented Dec. 29, 1970

3,551,541
METHOD OF POLYMERIZING MONOMERIC MATERIAL INTO CAST POLYMER SHEETS AND THE APPARATUS FOR THE CASTING OF SAID POLYMERIC SHEETS
Carlo Rossetti, % Rostero S.A. Acacias, 13 Av. Industrielle, Geneva, Switzerland
Continuation of application Ser. No. 534,525, Mar. 15, 1966. This application Dec. 11, 1969, Ser. No. 880,500
Int. Cl. B29d 7/08
U.S. Cl. 264—102                                    19 Claims

ABSTRACT OF THE DISCLOSURE

Apparatus for the casting of resin sheets from polymerizable flowable material is formed of a casing defining a sealable chamber and containing a plurality of vertically arranged spaced plate members. Glass mold members are supported on the plate members, and in combination with compressible sealing means form mold chambers. Means are provided for adjustably positioning the mold plates apart and for pushing the plate members together during the polymerization operation.

A method of polymerizing a flowable monomeric material into a cast polymer sheet in a mold is comprised of the steps of pouring the material into a vertically arranged mold open on its top, pushing the mold members together, evacuating the mold and heat polymerizing the monomeric material by uniformly heating the surfaces of the mold.

---

This application is a continuation of application Ser. No. 534,525 filed Mar. 15, 1966, now abandoned.

SUMMARY OF THE INVENTION

This invention generally relates to plastics and is particularly directed to a novel method and apparatus for producing cast polymer sheets.

The invention is generally applicable to the production of cast polymer or synthetic resin sheets obtained by the polymerization of a monomeric material with resulting increase of the specific weight of the material and decrease in volume. However, the invention is particularly applicable to and will, therefore, in the following be described in connection with the production of cast sheets of a polyalkylmethacrylate and their copolymers obtained by the polymerization of the corresponding monomer, as for example methyl methacrylate.

It has previously been proposed to cast polymethylmethacrylate sheets by polymerizing monomeric or partially polymerized methylmethacrylate in sheet casting molds. The sheet casting molds according to these prior art proposals are generally constructed of two parallel heat resistant glass plates, separated by a compressible gasket to allow for shrinkage. The monomeric material which may be admixed with a prepolymer, to wit, partially polymerized monomer, is introduced into the casting mold, i.e. between the glass plates, in the form of a viscous casting syrup. The polymerization between the glass plates is then effected by subjecting the mold to heat while the glass plates are clamped together. It is well known that careful control of the polymerization is necessary in order to obtain a bubble-free product of good optical clarity. In conducting the polymerization, allowance has to be made for an appreciable decrease in the volume which may be over 20%. The amount of shrinkage usually decreases as the size of the alcohol portion of the ester increases. Furthermore, the polymerization has to be conducted so as to remove dissolved gases and the highly exothermic polymerization reaction must be carefully controlled (see "Polymers and Resins" by Brage Golding, Van Nostrand Company, 1959, pages 457 and 458).

Dependent on the thickness of the sheets to be produced, the distance between the two glass plates of the molds is determined by the thickness of the compressible gasket or sealing cord, the amount of monomeric material to be introduced between the plates and the clamping pressure of the clamping means which urge the two mold plates towards each other.

When the polymerization is to be initiated, the charged molds are either inserted into a furnace which is heated by circulating hot air or they are placed into a hot water bath. Experience has demonstrated that with the prior art molds the best results are obtained if the plates extend in a horizontal plane during polymerization so as to negate as much as possible the hydrostatic pressure of still liquid monomer or prepolymer which has a tendency to cause outward bulging of the glass plates. After the polymeric substance between the plates has assumed a gel-like consistency, the molds are usually transported into a second furnace where the material is subjected to a second polymerization step. This additional afterpolymerization takes place at higher temperatures. When the desired degree of polymerization has been obtained, the molds are conveyed to a third furnace in which they are treated with steam. The steam has a tendency to penetrate between the glass plates and the polymeric sheets formed, thus facilitating detachment and removal of the glass plates from the cast sheets.

It will be appreciated that this prior art procedure, which has been generally adopted by the industry with certain variations and modifications for the production of cast sheets of the indicated nature, is relatively cumbersome. The disadvantages and drawbacks of this prior art procedure may be briefly summarized as follows:

(1) It is extremely time-consuming and requires considerable investment.

(2) Many manual operations have to be performed which, in turn, requires labor. The labor costs are therefore high.

(3) It is very difficult with this prior art procedure to produce cast sheets of uniform thickness and with a straight and plane surface. If the glass molds are arranged in a horizontal plane, as previously set forth, the plates tend to hang through and thus yield sheets of irregular or curved configuration. By contrast, if the molds are placed vertically, the methacrylate has a tendency to accumulate in the lower portion of the mold causing localized outward bulging of the plates. This again results in cast sheets of uneven surface and configuration.

(4) The polymerization is exothermic (about 130 kg. calories per kg.). Once the polymerization has been initiated, it thus proceeds under the evolution of heat and, if not properly controlled, may progress so rapidly that it may be compared to a chain reaction. If the temperature rise is not carefully checked and controlled, undesired high temperatures can easily be reached which cause the formation of bubbles and blemishes in the cast sheets, thus seriously affecting the appearance and optical characteristics of the final product. It is thus known that high temperatures may cause opaque areas in the sheets.

It is, therefore, extremely important to carefully control the progress of the polymerization throughout the procedure and to create suitably mild thermic conditions which, in turn, requires speedy and effective dissipation of excess heat.

It will be appreciated that, due to the low heat capacity of air, effective control of the thermic conditions during the procedure is very difficult if the heating is effected by circulating air. Nevertheless, hot air, as the source of heat for the polymerization, is predominantly used in the industry because immersion of the molds in water causes several other problems which are difficult to overcome. The water may thus penetrate into the molds and water-immersion type polymerization processes require additional apparative investment.

Accordingly, it is a primary object of this invention to overcome the drawbacks of the prior art casting procedures of the kind referred to and to provide a procedure for the production of cast polymer or resin sheets of the indicated nature which is superior to the known procedures and which results in cast polymer sheets of superior quality.

Another object of the invention is to provide a procedure for casting resin sheets of the indicated kind which permits a large output at relatively low cost and which simplifies the casting as compared to the prior art methods.

It is also an object of this invention to provide a method and apparatus for the production of cast resin sheets, particularly sheets of polyalkylmethacrylates, according to which the thickness and configuration of the individual sheets and the reaction conditions in general can be readily and easily controlled and varied.

Generally, it is an object of this invention to improve on the art of producing cast resin sheets as presently practiced.

Briefly, and in acordance with this invention, the casting of the resin sheets is effected in an apparatus which includes a pressure- and vacuum-resistant casing or housing. The housing defines a chamber with accommodates a number of hollow metal plates. The metal plates extend within the chamber in substantially vertical, parallel orientation and are laterally movable. In a preferred embodiment, the metal plates are suspended from a rail which traverses the upper portion of the chamber, the individual plates being suspended from the rail by pulleys or the like. The hollow metal plates, in turn, have projecting bottom ledges or abutments for supporting the bottom edge of glass plates. Each glass plate bears with surface contact against the adjacent metal plate and is detachably attached thereto by means of hooks, spring clips or the like. A battery of such hollow metal plate-glass plate assemblies is suspended from the rail so that two glass plates are arranged between any two adjacent metal plates, a casting space being formed between adjacent glass plates. Casting syrup is introduced in the space between adjacent glass plates, the marginal portions of the glass plates being sealed by gaskets, sealing cords, or the like, with the top, however, being left open. Any two adjacent glass plates sandwiched between metal plates thus form a mold, the casting space being defined by the gasket. The projecting bottom ledges of the metal plates are preferably smooth or polished so as to facilitate movement of the glass plates on these ledges. It is also feasible to provide small rollers or balls on the bottom ledges, particularly if the glass plates are heavy, so as to facilitate the movability of the glass plates thereon.

The gasket material must be insoluble in the particular resin material. The thickness of the gaskets or compressible sealing cord will, of course, be dependent on the thickness of the sheets to be cast. Generally, however, it should be slightly thicker than the sheets to be produced so that effective sealing will take place at the time the glass molds are assembled, to prevent leakage of casting liquid.

The hollow metal plates are also preferably provided with laterally projecting spacers to facilitate the adjustment of the distance to the next adjacent metal plate and thus of the space between the adjacent glass plates.

After the spacers have been adjusted and the casting syrup has been poured onto the glass molds, the entire assembly is pushed together in the manner of a filter press. For this purpose, suitable pusher or clamping means should be provided within the housing.

A fluid such as, for example, water is then circulated through the hollow metal plates, the temperature of the water being adjustable and controllable, for example, by means of suitable heat exchange means or the like. In order to increase the heat exchange between the metal plates and the glass plates, the outer surfaces of the metal plates should be smooth and plane so that good contact between the metal plates and the glass plates takes place.

The water circulation through the metal plates should be effected so that substantially the same temperature prevails over the entire surface of the respective metal plates, thereby uniformly transferring heat to or taking up heat from the associated glass plates.

Since uniform and controlled temperature distribution is of the essence for a successful performance of the polymerization, the speed of the circulating liquid through the metal plates is important. Experience has demonstrated that the speed of the liquid through the metal plates should preferably be such that the entire volume of the liquid within each metal plate is exchanged at least once every five minutes. It has been found that the cavity or hollow space of the metal plate should preferably be divided to form a tortuous flow passage, thereby preventing laminal flow with dead spaces.

The various features of novelty which characterize the invention are pointed out with particularity in the claims annexed to and forming a part of this specification. For a better understanding of the invention, its operating advantages and specific objects attained by its use, reference should be had to the accompanying drawings in which there is illustrated and described a preferred embodiment of the invention.

Figure 4:
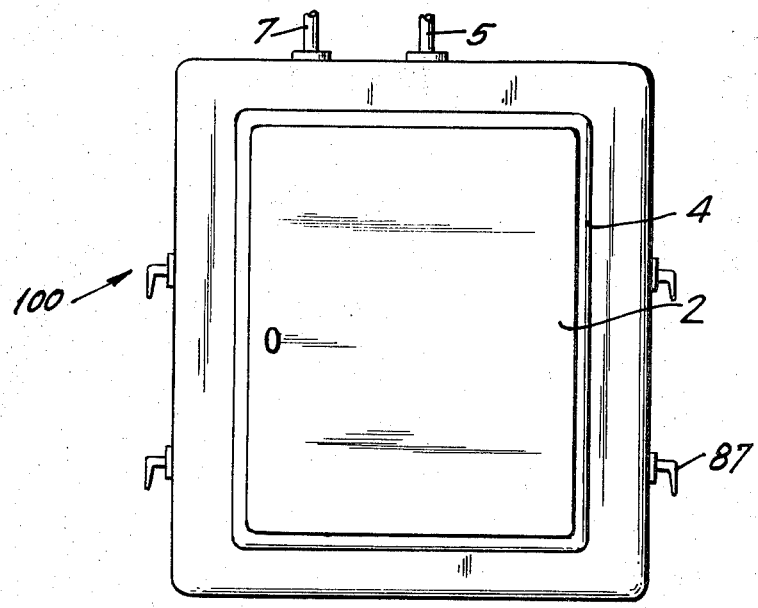
FIG. 4 is a side elevation of the apparatus.

Referring now to the drawings, the inventive apparatus for casting resin sheets is generally indicated by reference numeral 100 and includes a housing or casing 1. The housing is of steel or the like metal, is pressure- and vacuum-resistant, and, as best seen in FIG. 4, has a door 2 for permitting access to the interior space or chamber 3 of the housing. The door 2, when closed, is effectively sealed against the wall of the housing and for this purpose a compressible gasket 4 or the like sealing means is provided between the marginal area of the door and the housing. A similar door (not shown) may be arranged on the opposite side wall of the housing. The housing has also valve-controlled connections 5 and 7 for selectively connecting the chamber 3 to pressure and vacuum sources, respectively.

A rail 8 traverses the upper portion of chamber 3 and is connected to the housing wall. A number of metal plates 9 are suspended from the rail, as clearly seen in FIG. 1. For this purpose, each metal plate 9 is provided with a rod 10, one end of which is secured to the metal plate 9, as indicated by reference numeral 11, while the other end carries a pulley 12 which runs on the rail 8. In the particular embodiment, four metal plates 9 have been shown, but in practice a much larger number may be used. As many as twenty or thirty metal plates may thus be suspended from the rail 8. In view of the pulley suspension arrangement, the metal plates may be moved laterally.

Each metal plate has a bottom ledge or strip 13 which projects laterally for supporting the bottom edge of a glass plate 15. The bottom ledges 13 have a smooth or polished top surface which may be provided with rollers or balls so as to facilitate sliding movement of the glass plates 15 on the ledges 13.

The metal plates 9, all of which are of substantially identical construction, are hollow and define an interior space 16 which is divided into several compartments by means of baffles or dividers 17 to form a tortuous flow passage. The tortuous flow passage facilitates the movement of flow of fluid through the space 16.

Figure 3:
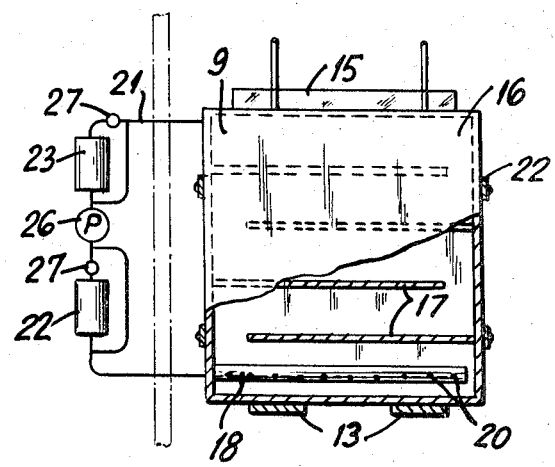
FIG. 3 is a section along line 3—3 of FIG. 1.

Liquid is introduced into the space 16 through a pipe 18 having a plurality of orifices or outlets 20. The liquid, usually water, flows through the tortuous flow passage defined by the baffles 17 and exits through conduit 21 to pass through heat exchanging means which preferably should consist of at least two heat exchangers 22 and 23, one for heating and one for cooling, whereafter the liquid again enters pipe 18. The circulation of the liquid through the plates and the conduit 21 is effected by a pump 26, valves 27 being located within the circuit at any suitable location. It will be appreciated that elements 21, 22, 23 and the flow passage constitute a fluid path. While the means for circulating liquid through one of the plates 9 has been illustrated in FIG. 3, it will be appreciated that this is a diagrammatic showing and that the flow of liquid through each of the plates 9 may be conducted centrally by suitable pump- and valve-controlled conduit means. It is recommended that each plate is supplied with liquid from a collector, the discharge flowing into a second collector.

The glass plates 15 stand with their lower edge on the ledges 13 and are held in surface contact and in a detachable manner against the adjacent surface of the respective metal plate 9 by means of spring clips or the like 22a. Each of the metal plates 9 is also provided with spacers 24 to suitably adjust the space between adjacent metal plates and thus between the glass plates.

The arrangement also includes pusher or clamping means for pushing the metal plates-glass plates assembly together into a compact unit. These means are in the nature of rods 46 which pass threadedly through the wall of the housing 1 and are provided wth therminal disc members 28 bearing against the outer surface of the terminal metal plates 9. Rods 46 have actuating handles 87 outside the housing 1. By turning the handles 87, the metal plate-glass plate assembly within the space 3 can thus selectively be pushed together or spaced apart.

The operation of the apparatus is as follows:

The operator gains access to the interior chamber 3 of the housing 1 through the door 2, adjusts the spacers 24 to the desired setting and places the individual glass plates 15 on the bottom ledge of the respective metal 9. He then adjusts the spring clips 22a to hold the glass plates against the respective exterior surface of the metal plate. The spacers 24 are set and the sealing means, in the form of compressible gaskets or sealing cord, 33 are placed between adjacent glass plates 15 in dependence on the thickness of the sheets to be cast. In the embodiment here shown, the glass plates have marginal grooves 35 to facilitate the insertion of the sealing gasket or cords 33, but in practice it is generally not necessary to provide such grooves since the attachment and setting of the sealing gaskets does not present any problem.

Figure 1:
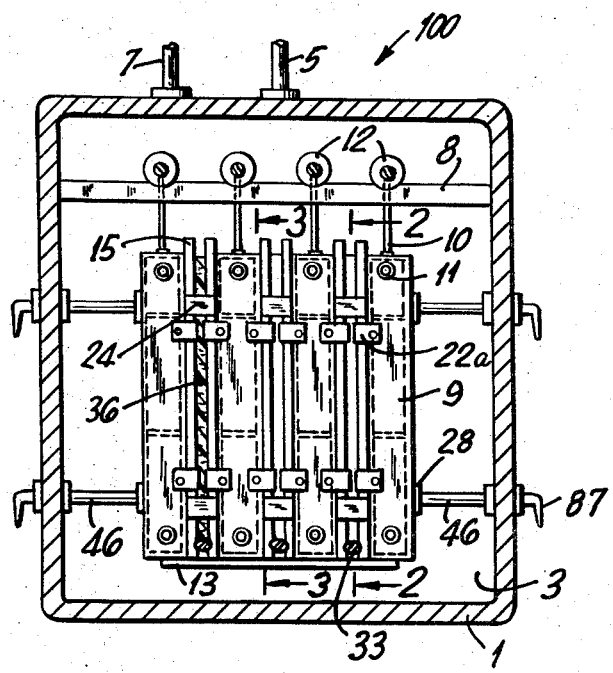
FIG. 1 is a vertical section through a sheet casting apparatus in accordance with the invention.
Figure 2:
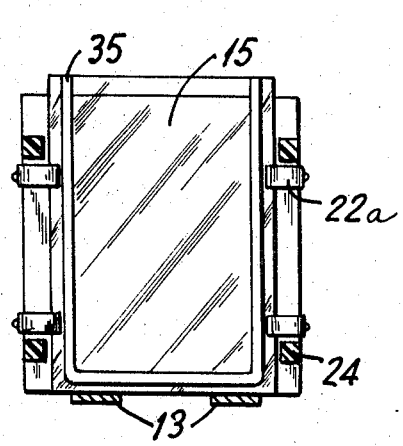
FIG. 2 is a section along line 2—2 of FIG. 1.

Monomer or monomer admixed with prepolymer in the form of casting liquid is then filled from above into the casting spaces between any two adjacent glass plates 15, as indicated at 36 in the left-hand glass mold-metal plate assembly of FIG. 1.

After all the casting spaces between adjacent glass plates have thus been filled with the casting liquid, the rod mechanisms 46, 87, 28 are rotated until the entire battery of plates has been pushed together to the desired degree, the movement of the individual plates being facilitated by the pulleys 12. The operator then closes the doors 2 in sealing manner.

The casting syrup should, of course, contain the usual polymerization initiator or catalyst and may be admixed with dyestuffs, pigments, and the like additives.

The casting procedure is intiated by a first period for degassing the monomeric material at a relatively low temperature. For this purpose, the casing is quickly evacuated to a negative pressure value at which, at the respective polymerization temperature, a calm degassing of the monomeric material takes place. At the same time, water is circulated through the plates. The specific temperature of the water depends on the respective monomer and is a function of the relationship between vacuum and temperature so that a calm degassing of the monomer takes place without any appreciable turbulences. The degassing is important in order to prevent air occlusions which may form bubbles in the final product.

The relationship vacuum to temperature is preferably chosen so that the system for the given pressure and temperature is just below the boiling point of the material. The degassing procedure referred to is in the nature of a calm boiling and, dependent on the sheets to be produced, will require between 5 minutes to about one hour. The polymerization sets in during the degassing period and at the end of the degassing period the polymerization has already progressed to such an extent that the viscosity of the monomer has appreciably increased. Although turbulences should be avoided during the degassing, it results in a thorough mixing of the monomer in the molds under excellent heat dissipation and heat supply conditions. This is due to the circulation of the water through the hollow metal plates and the provision of the heat exchangers 22 and 23, whereby the temperature of the water flowing through the flow passage 16 of the plates can be readily controlled. The pump 26 should be sufficiently strong so as to permit complete circulation at least once every five minutes.

Due to the constant circulation of the liquid through the hollow spaces of the metal plates, the thermal conditions are much more favorable than those prevailing in prior at processes wherein hot air is passed through a furnace or the molds are placed in hot water. Due to the inventive procedure, the polymerization proceeds much more rapidly.

The mixing caused by the degassing results in the additional advantage that the material to be polymerized does not separate into smaller and longer molecular chains by gravitation and that, for example, pigments and other additives are maintained in suspension within the mass until a very high degree of viscosity has been reached. This, of course, prevents local accumulation of additives and results in a final product in which any additives are uniformly and homogeneously distributed throughout the entire sheet.

After the degassing, which, as previously stated, normally takes between five minutes and one hour, the polymerization period proper sets in. During this polymerization step, the temperature is maintained at such a value that rapid polymerization takes place without, however, permitting the temperature to rise to an extent so as to lose effective control over the thermal condititons. As will be recalled, if the temperature rises too quickly to high values, the polymerization may proceed like a chain reaction resulting in undesirable characteristics of the final product. Therefore, the rise of the temperature during the polymerization should be carefully controlled so that any undesired peak temperature may immediately be eliminated by cooling the plate which, in turn, is effected by properly controlling the temperature of the liquid medium, to wit, the water circulating through the interior of the plates. Care should thus be taken so that any temperature rise can immediately be neutralized by cooling, to wit, by heat dissipatiton from the system.

The pressure in the system is increased during the polymerization. The pressure rise should be chosen so as not to result in boiling of the monomeric substance due to the relationship pressure to temperature.

It will be appreciated from the above that it is of primary importance during the polymerizing step to lead away exothermic heat which is generated during the polymerization. The heat capacity of the circulating medium is therefore of importance and polymerization periods can be obtained which are appreciably shorter than the corresponding periods in prior art procedures.

Generally, polymerization in accordance with the inventive procedure proceeds up to ten times as rapidly as prior art polymerization procedures.

An additional advantage of the rapid polymerization of the monomeric material is that the detachment or removal of the glass plates after polymerization from the cast sheets is extremely simple and no steam is necessary to separate the glass plates from the cast sheets.

Cast sheets produced in accordance with this invention have superior physical characteristics, are extremely uniform and homogeneous in composition and configuration including layer thickness. The surface is usually smooth and even. Even if relatively thin sheets are to be produced, thickness tolerances of within $\mp 5\%$ may be maintained, which is impossible in conventional prior art procedures.

The inventive apparatus also enables mass production with high output since the metal and glass plates can immediately be reused after the pusher or clamping means 46, 27, 28 have been released and the individual cast sheets have been removed from the furnace. This is effected by the operator after opening of the doors. If the next batch of sheets is to be thinner or thicker, the spacers are simply correspondingly adjusted or metal foils or the like may be inserted between the metal plates and the abutting glass plates.

The inventive procedure results in the production of bubble-free sheets, since any gas originally entrapped within the monomeric mass is removed by the original vacuum treatment, the gas readily escaping from the mass through the open tops of the glass molds.

Due to the fact that the polymerization from the very beginning takes place in situ, the glass plates need not be carried around within the plant and thus are not soiled and have not to be cleaned by washing or dusting as is usually required in conventional procedures. This, of course, results in considerable savings in respect to broken and damaged glass plates, a saving which is important in calculating the over-all costs of the cast sheets. It is thus known that in prior art procedures about ⅛ of the total production cost of cast sheets must be attributed to losses due to broken glass plates.

Another advantage of the inventive procedure is that the apparatus can be readily adapted to produce sheets of varying thickness and configuration, an advantage which is not possible in conventional processes.

As previously set forth, the inventive procedure is applicable to the production of cast sheets from any monomeric material but the preferred raw materials are methacrylates such as methyl methacrylate and their copolymers.

It has been established that the amount of polymerization catalyst in the casting liquid influences the subsequent polymerization. It has thus been ascertained that the inventive process proceeds best if the amount of polymerization catalyst in gram per 1 kilo of monomer corresponds to the value calculated from the formula $$\frac{K}{D^2 + d^3 + 2Dd}$$

wherein K is the catalyst constant which in respect to benzoylperoxide, for example, is 24, D is the thickness of the glass plates in millimeters, and $d$ is the thickness of the cast sheets to be produced in millimeters.

The formula is an expression for an exponential curve which defines the decrease of the catalyst amount as a function of the plate thickness to be produced.

The invention will now be described by several examples, it being understood, however, that these examples are given by way of illustration and not by way of limitation and that many changes may be effected without affecting in any way the scope and spirit of this invention as recited in the appended claims.

All the examples were carried out in the apparatus shown in the accompanying drawings.

EXAMPLE I

The purpose of this test was to produce transparent polymethylmethacrylate sheets of an area of 6 x 8 feet and a thickness of ⅛ inch. The equipment as illustrated in the drawings was used as sheet casting mold and the spacers 22 were set so that the distance between the opposing surfaces of the glass plates of the mold was ⅛ inch x 1.25. The thickness of the glass plates, which were of inorganic glass, was 10 mm. The casting liquid consisted of monomeric methylmethacrylate which was admixed with 80 grams of stearic acid per 100 kilograms of monomer. The monomeric methylmethacrylate was moreover admixed with 12 grams of benzoyl peroxide per 100 kilograms of monomer, the benzoyl peroxide acting as catalyst.

The casting liquid described was then filled into the casting spaces between the glass plates and the doors of the housing were closed. The temperature of the circulating water which passes through the hollow metal plates was 60° during the filling procedure but was raised to 88° C. upon completed filling. The housing was then rapidly evacuated.

Figure 5:
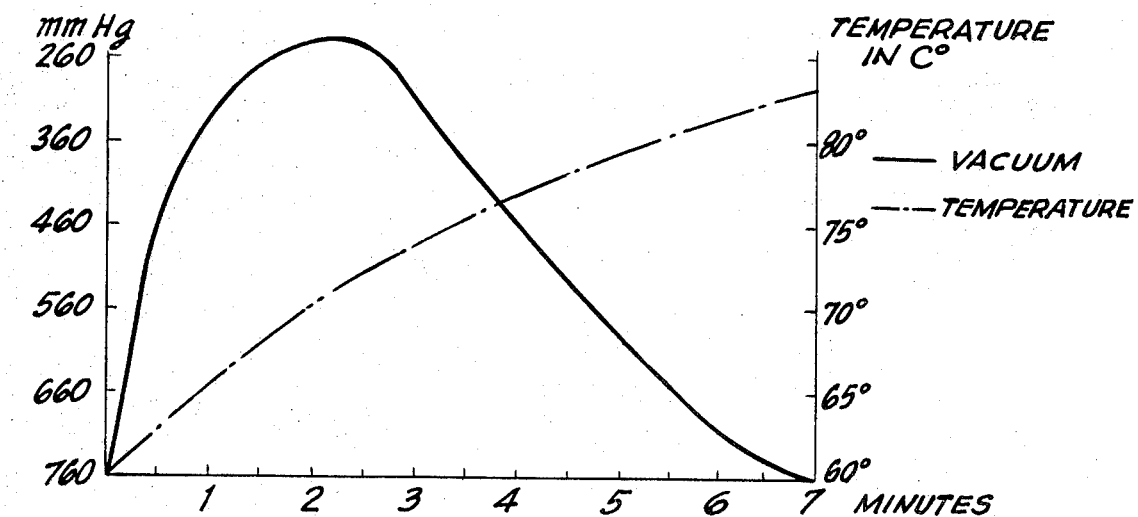
FIG. 5 is a graph showing the relationship between temperature and pressure as a function of time.

The course of the temperature and pressure curve as a function of time is plotted in FIG. 5.

Effective degassing of the monomeric material takes place during this low pressure period. The vacuum period is terminated after about 7 to 10 minutes and the pressure within the casing is raised to atmospheric pressure, to wit, 760 mm. Hg. The temperature was maintained at 88° C., and while the water circulated at this temperature constantly through the plates, the polymerization was allowed to progress for 2½ hours. The temperature of the circulating water was then raised to 110° C. during about 30 minutes, whereafter it was cooled down to 75° C. The battery of plates was then opened by actuation of the pusher rods and the cast sheets were removed from the glass mold without difficulty. In order to facilitate the removal of the sheets from the glass molds, a wedge may be inserted in the transition zone between the sheets and the glass plates, whereafter, by impact action on the wedge, the sheets immediately become detached from the glass surface.

EXAMPLE II

Transparent plates of a thickness of 18 mm. were produced according to this test. The monomeric methyl methacrylate contained 0.38 gram of benzoyl peroxide per 100 kg. of monomer, while the stearic acid content was 150 gram per 100 kg.

The initial vacuum period which, as in Example I, starts at a temperature of 60° C., lasted for about 45 minutes. The maximum vacuum value was 250 mm. Hg and in analogous manner as described in Example I the pressure within the housing was raised to 760 mm. Hg after 45 minutes. The pressure in the housing was then raised after the vacuum period to 1000 mm. Hg and the time/temperature curve in the circulating water may proceed as follows: 5 hours at 80° C., then 4 hours at 77° C., thereafter 8 hours at 70° C. and 3 hours at 110° C. The water is then cooled to 75° C. and the completed methacrylate plates are removed from the mold.

EXAMPLE III

The purpose of this test is to produce opaque cast sheets from methyl methacrylate-styrene copolymer. The monomeric mixture contained 5 kg. of styrene monomer per 100 kg. of monomeric methyl methacrylate. The catalyst was the same as in Example I, and the polymerization was conducted as described in said example.

EXAMPLE IV

The monomeric mixture of Example III is thoroughly mixed with 0.5 kg. of titanium dioxide and is then polymerized according to the procedure of Example I. An opaque polymer sheet of white color is obtained.

EXAMPLE V

Monomeric styrene is catalyzed with 30 g. of lauroyl peroxide per 100 kg. of monomer. The sheet thickness was ⅛ inch. The casting liquid was filled into the spaces between the glass plates at 40° C. and the vacuum period was 15 minutes. The polymerization was effected at 66° C. for 4 hours and the cast sheets were then removed from the molds.

While a specific embodiment of the invention has been shown and described in detail to illustrate the application of the inventive principles, it will be understood that the invention may be embodied otherwise without departing from such principles.

What is claimed is:

1. Apparatus for the casting of resin sheets from polymerizable flowable material, comprising in combination a casing defining a sealable chamber, at least three heat conducting hollow metallic plate members, each said plate member defining an interior flow passageway which is arranged in indirect heat transfer relationship with substantially the entire exterior face surface of said plate member, means for supporting said plate members within said sealable chamber in substantially vertical orientation and with the exterior face surface thereof in horizontal spaced and substantially parallel relationship while permitting horizontal movement of said plate members, a plurality of pairs of oppositely arranged horizontally spaced glass mold plates being supported in vertical orientation by the exterior face surfaces of said plate members, means for detachably holding each of said mold plates in surface contact with the exterior face surface of one of said plate members and for affording horizontal movement of said mold plate from said plate members, compressible sealing means being disposed between and in contacting relationship with each said pair of mold plates and defining in combination with said mold plates a glass-lined mold chamber open at its top and closed along its side and bottom edges for receiving a supply of polymerizable flowable material therein, means for adjustably horizontally spacing said plate members apart whereby said mold plates detachably held against said plate members in each said pair are spaced apart, means for pushing said plate members toward one another, means for circulating fluid through the flow passages in said plate members, and means for controlling the temperature of the fluid circulating through the flow passages.

2. Apparatus, as claimed in claim 1, further comprising means for selectively connecting said chamber to a vacuum source and a pressure source for selectively exhausting and pressurizing said chamber.

3. Apparatus, as claimed in claim 1, wherein said means supporting said plate members include a rail extending across said chamber in the upper portion thereof and suspending means suspended from said rail and connected to each of said plate members.

4. Apparatus, as claimed in claim 3, wherein said suspending means includes a plurality of pulleys running on said rail, each pulley including a connecting member connecting it to one of said plate members.

5. Apparatus, as claimed in claim 1, wherein said holding means include spring biased clip means attached to each plate member and engaging the associated mold plate to urge the mold plate against the adjacent surface of the plate member, said holding means further including ledge means extending adjacent the bottom of said plate members to support the bottom edge of said mold plates.

6. Apparatus, as claimed in claim 1, wherein said means for circulating fluid through said flow passages of said plate members includes conduit means extending outside said plate members and communicating with said flow passages to form a circuit and a pump in said circuit for driving the fluid through said circuit.

7. Apparatus, as claimed in claim 1, wherein said temperature control means includes heat exchange means.

8. Apparatus, as claimed in claim 6, wherein heat exchange means are connected in said conduit means.

9. Apparatus, as claimed in claim 1, wherein said pusher means comprises a plurality of rods threadedly traversing said casing, each rod having an actuating handle at its end outside the casing and having a disc member at its other end inside said chamber for engaging the outermost of said plate members whereby upon rotation of said rods said disc members are selectively urged toward or away from the plate members.

10. Apparatus, as claimed in claim 1, further comprising door means on said casing, said door means being movable between an open position in which access into said chamber is provided and a closed position which said door means are closed in sealing manner.

11. Apparatus, as claimed in claim 1, wherein means being arranged within said flow passages for describing a tortuous flow path through said hollow plate members.

12. In a method for polymerizing a flowable monomeric material selected from the group consisting of lower alkyl methacrylate, styrene and mixtures thereof into a cast polymer sheet of uniform thickness and composition having smooth surfaces, comprising the steps of defining a plurality of vertically extending mold spaces open at their tops and sealed along their side and bottom edges and having smooth opposed face surfaces movable in the horizontal direction, adjusting the horizontal spacing between the opposed face surfaces in the mold space and rigidly limiting the maximum horizontal spacing between the face surface while permitting movement of the face surfaces toward one another in the horizontal direction for obtaining the desired uniform thickness dimension of the cast sheet in accordance with normal shrinkage conditions, pouring the monomeric material into the mold spaces through the open tops thereof, establishing vacuum conditions within the open topped vertically oriented mold spaces in a controlled manner for removing entrapped gas from the monomeric material, supplying heat through the opposed face surfaces of the vertically oriented mold spaces to initiate polymerization in the monomeric material, closely regulating the temperature of monomeric material during polymerization so as to maintain the exothermic heat generation during polymerization just below a temperature level conducive to boiling of the monomeric material until polymerization is completed, and separating the cast polymer sheets from the opposed face surfaces of the mold spaces.

13. A method, as claimed in claim 12, wherein the polymerization is carried out at a temperature which is above the temperature prevailing during the degassing stage.

14. A method, as claimed in claim 12, wherein said monomeric material is admixed with a polymerization catalyst, the amount of catalyst corresponding in gram of catalyst per kilogram of monomeric material to a value calculated from the formula $$\frac{K}{D^2 + d^3 + 2Dd}$$

wherein:

K is the catalyst constant;
D is the thickness of the glass plates; and
d is the thickness of the cast sheets to be produced.

15. A method, as claimed in claim 12, wherein the steps of supplying heat to the opposing surfaces of the mold space and closely regulating the temperature of the monomeric material comprises contacting the face of the support face opposite the one contacting the monomeric material with a rigid hollow holding surface, circulating a fluid heat transfer medium through the interior of the hollow holding surface, and regulating the temperature of the fluid heat transfer medium being circulated.

16. A method, as claimed in claim 12, wherein the step of establishing vacuum conditions comprises maintaining the temperature of the monomeric material at a level at which calm degassing takes place with the temperature to vacuum ratio being such that the monomeric material is maintained just below its boiling point.

17. A method, as claimed in claim 16, wherein the temperature is about 60° C.

18. A method, as claimed in claim 16, wherein the degassing stage is effected for between about 5–60 minutes.

19. Apparatus for the casting of resin sheets from flowable polymerizable plastic material comprising in combination:

a casing defining an interior chamber, door means mounted on said casing and being movable between an open position in which access to said chamber is provided and a closed position in which said door means is closed in sealing manner, a rail traversing the upper portion of said chamber and being secured to said casing, a plurality of vertically oriented horizontally spaced metal plate members arranged within said casing, means for suspending each of said plate members from said rail and for affording variable spacing of said plate members in the horizontal direction, each of said plate members defining an interior cavity, means within said cavity defining a tortuous flow path therethrough, means for circulating fluid through the flow path in said cavity, means for controlling the temperature of said fluid, spacer means on said plate members for adjustably spacing the horizontal distance between adjacent plate members, a plurality of molds arranged in said chamber with each said mold being positioned between a pair of said plate members, each of said molds including two horizontally spaced parallel glass plates, compressible gasket means positioned between the adjacent faces of said parallel glass plates for sealing the space between the glass plates adjacent their circumferential edges except for a portion near the top thereof whereby an open space is formed for receiving the flowable polymerizable plastic material, spring clamps for detachably holding each of said glass plates in surface contact with the surface of the adjacent plate member, support means attached to each of said plate members adjacent the lower end thereof for supporting the bottom edge of said glass plate in contact with said plate member, means for selectively connecting said chamber to a vacuum source and a pressure source, and means for urging all of said metal plate members and glass plates toward one another to form a compact unit with said compressible gasket means permitting said glass plates forming said molds to move toward one another during shrinkage of the plastic material in said molds during polymerization for maintaining contact of said glass plates with said plastic material.

References Cited

UNITED STATES PATENTS

| | | | |
|---|---|---|---|
| 1,941,420 | 12/1933 | Siegfried | 264—102 |
| 2,975,476 | 3/1961 | Burke | 264(Vacuum Dig.) |
| 3,165,786 | 1/1965 | Yagi et al. | 264—219 |
| 2,495,100 | 1/1950 | Henderson | 25—121 |
| 2,627,628 | 2/1953 | Paré | 249—82 |
| 2,687,555 | 8/1954 | Anspon et al. | 249—82 |
| 2,704,265 | 3/1955 | Lyon | 117—211 |
| 3,267,517 | 8/1966 | Altermatt | 18—26 |
| 3,286,973 | 11/1966 | Sylvester | 249—82 |

MORRIS LIEBMAN, Primary Examiner

T. MORRIS, Assistant Examiner

U.S. Cl. X.R.

18—26, 38, 39, 47; 249—78, 82, 134; 264—313, 319